(12) United States Patent
Koizumi et al.

(10) Patent No.: US 11,480,762 B2
(45) Date of Patent: Oct. 25, 2022

(54) SHORT-WAVELENGTH INFRARED IMAGING LENS AND IMAGING DEVICE INCLUDING TWO LENS GROUPS OF −+ REFRACTIVE POWERS HAVING SEVEN LENSES OF −++−−++ REFRACTIVE POWERS OR EIGHT LENSES OF −+++−−++ REFRACTIVE POWERS

(71) Applicant: KYOCERA SOC CORPORATION, Kanagawa (JP)

(72) Inventors: Noboru Koizumi, Kanagawa (JP); Takao Tanabe, Kanagawa (JP); Masaya Ishii, Kanagawa (JP)

(73) Assignee: KYOCERA SOC CORPORATION, Kanagawa (JP)

( * ) Notice: Subject to any disclaimer, the term of this patent is extended or adjusted under 35 U.S.C. 154(b) by 285 days.

(21) Appl. No.: 16/838,481

(22) Filed: Apr. 2, 2020

(65) Prior Publication Data
US 2020/0319437 A1    Oct. 8, 2020

(30) Foreign Application Priority Data

Apr. 5, 2019   (JP) .............................. JP2019-073026

(51) Int. Cl.
*G02B 13/14*   (2006.01)
*G02B 9/64*   (2006.01)

(52) U.S. Cl.
CPC .............. *G02B 9/64* (2013.01); *G02B 13/14* (2013.01)

(58) Field of Classification Search
CPC ................................... G02B 9/64; G02B 13/14
See application file for complete search history.

(56) References Cited

U.S. PATENT DOCUMENTS

2018/0067333 A1   3/2018   Ishibashi
2019/0204569 A1*  7/2019   Jiang ....................... G02B 13/06

FOREIGN PATENT DOCUMENTS

| JP | 2008026594 A | 2/2008 |
|----|---|---|
| JP | 2013047753 A | 3/2013 |
| JP | 2015060194 A | 3/2015 |

(Continued)

OTHER PUBLICATIONS

Machine Translation of Japanese Office Action Corresponding to Application No. 2019073026 dated Aug. 30, 2022.

*Primary Examiner* — Wen Huang
(74) *Attorney, Agent, or Firm* — Dority & Manning, P.A.

(57) ABSTRACT

A short-wavelength infrared imaging lens includes first and second lens groups arranged in order from an object side. The first lens group has a negative refractive power as a whole. The second lens group has a positive refractive power as a whole and includes at least one positive lens that satisfies following conditional expressions (1) and (2):

$$V2p > 40 \quad (1)$$

$$N2p > 1.7 \quad (2)$$

Here, N2p is a refractive index N [1.53] of the positive lens at a wavelength of 1.53 μm, and the Abbe number V2p is an Abbe number of the positive lens in a short-wavelength infrared range and is defined as (N [1.53]−1)/(N [0.9]−N [2.325]) when refractive indexes of the at least one positive lens at wavelengths of 0.9 μm, 1.53 μm, and 2.325 μm are represented by N [0.9], N [1.53], and N [2.325], respectively.

4 Claims, 7 Drawing Sheets

(56) References Cited

FOREIGN PATENT DOCUMENTS

| JP | 5891912 | 3/2016 |
|----|---------|--------|
| JP | 2018040858 A | 3/2018 |
| WO | WO2016027786 A1 | 2/2016 |
| WO | WO2017295730 A1 | 11/2017 |

* cited by examiner

SHORT-WAVELENGTH INFRARED IMAGING LENS AND IMAGING DEVICE INCLUDING TWO LENS GROUPS OF −+ REFRACTIVE POWERS HAVING SEVEN LENSES OF −++−−++ REFRACTIVE POWERS OR EIGHT LENSES OF −+++−−++ REFRACTIVE POWERS

TECHNICAL FIELD

The present invention relates to a short-wavelength infrared imaging lens and an imaging device including the imaging lens, and more particularly, to a short-wavelength infrared imaging lens of a retro-focus type and an imaging device including the imaging lens.

BACKGROUND ART

Generally, infrared rays are classified into near infrared, short-wavelength infrared, mid infrared, and far infrared rays according to the wavelengths, and the short-wavelength infrared rays usually refer to a wavelength band of 1000 to 2500 nm. Since the short-wavelength infrared rays have a wavelength close to that of visible light, they are reflected or absorbed by an object similarly to visible light, and thus are advantageous for high-resolution imaging. In addition, there are objects that cannot be effectively discriminated in the visible range but can be discriminated by using short-wavelength infrared rays, and therefore, short-wavelength infrared optical systems are used in fields such as inspection, detection, and monitoring. As a conventional technology relating to such a short-wavelength infrared optical system, there is an optical system described in JP2008-026594A, for example.

As a conventionally known optical system, there is a retro-focus lens including a first lens group having a negative refractive power and a second lens group having a positive refractive power (for example, JP5891912B2). The retro-focus lens can ensure a sufficient distance from the image plane to the exit pupil.

Further, as a conventionally known optical system, there is an optical system having two lens groups located in front of and behind an aperture stop, respectively (for example, JP2018-040858A).

The short-wavelength infrared optical system described in JP2008-026594A favorably corrects chromatic aberration in a wavelength range of 1500 to 2000 nm but has an f-number of about 4 and hence is not bright. There are short-wavelength infrared imaging lenses for wavelength ranges of 900 nm to 1700 nm and 1700 nm to 2400 nm.

However, there is no high-resolution imaging lens with a small f-number and well corrected chromatic aberration over a wide band of 900 to 2400 nm.

The optical system described in JP5891912B2 is a bright optical system having an f-number of about 1.8, but the target wavelength range of this optical system is a visible range.

The optical system described in JP2018-040858A is a bright optical system having an f-number of about 1.4, but the target wavelength range of this optical system is a visible range and the optical system has a large number of lenses including an aspheric lens.

As a commonly used low-dispersion optical glass, there is one having an Abbe number Vd for d-line of 70 or more but its refractive index Nd for d-line is 1.55 or less. Such a glass has a low dispersion in the short-wavelength infrared range but cannot sufficiently correct spherical aberration due to the small refractive index. In the optical systems described in Patent Documents 2 and 3, the optical glass has a refractive index Nd of 1.7 or more and an Abbe number Vd of 50 or more, which is relatively large. In such a glass, an Abbe number V in a short-wavelength infrared range is of about 26, which is so small for a positive lens (a lens having a positive refractive power) and so large for a negative lens (a lens having a negative refractive power) that sufficient chromatic aberration correction cannot be made.

SUMMARY OF THE INVENTION

The present invention has been made in view of the above-described problems of the prior art, and an object of the present invention is to provide a short-wavelength infrared imaging lens and an imaging device including the imaging lens, such that the imaging lens can achieve both sufficient chromatic aberration correction and sufficient spherical aberration correction in the short-wavelength infrared range without using an aspherical lens and can ensure a sufficient back focus.

A short-wavelength infrared imaging lens according to one embodiment of the present invention comprises a first lens group and a second lens group arranged in order from an object side, the first lens group having a negative refractive power as a whole and the second lens group having a positive refractive power as a whole, wherein the second lens group includes at least one positive lens that satisfies both following conditional expressions (1) and (2) with respect to an Abbe number V2p and a refractive index N2p thereof:

$$V2p > 40 \quad (1)$$

$$N2p > 1.7 \quad (2)$$

where N2p is a refractive index N [1.53] of the at least one positive lens at a wavelength of 1.53 μm, and the Abbe number V2p is an Abbe number of the at least one positive lens in a short-wavelength infrared range and is defined as (N [1.53]−1)/(N [0.9]−N [2.325]) when refractive indexes of the at least one positive lens at wavelengths of 0.9 μm, 1.53 μm, and 2.325 μm are represented by N [0.9], N [1.53], and N [2.325], respectively.

According to this configuration, it is possible to achieve both sufficient chromatic aberration correction and sufficient spherical aberration correction in the short-wavelength infrared range without using an aspheric lens. In addition, since the first lens group having a negative refractive power is disposed on the object side and the second lens having a positive refractive power is disposed on the image side, a sufficient back focus can be obtained.

In the above short-wavelength infrared imaging lens, preferably, the second lens group further includes at least one negative lens that satisfies both following conditional expressions (3) and (3) with respect to an Abbe number V2n and a refractive index N2n, thereof:

$$V2N < 22 \quad (3)$$

$$N2n > 1.81 \quad (4)$$

where N2n is a refractive index N [1.53] of the at least one negative lens at a wavelength of 1.53 μm, and the Abbe number V2n is an Abbe number of the at least one negative lens in the short-wavelength infrared range and is defined as (N [1.53]−1)/(N [0.9]−N [2.325]) when refractive indexes of the at least one negative lens at wavelengths of 0.9 μm, 1.53 μm, and 2.325 μm are represented by N [0.9], N [1.53], and N [2.325], respectively.

According to this configuration, the chromatic aberration correction and the spherical aberration correction in the short-wavelength infrared range are performed more favorably.

In the above short-wavelength infrared imaging lens, preferably, the second lens group includes an aperture stop, a second lens front group composed of at least three lenses disposed on an object side of the aperture stop, and a second lens rear group composed of at least three lenses disposed on an image side of the aperture stop, wherein the at least one positive lens comprises a positive lens included in the second lens front group and a positive lens included in the second lens rear group, and the at least one negative lens comprises a negative lens included in the second lens front group and a negative lens included in the second lens rear group.

According to this configuration, the chromatic aberration correction and the spherical aberration correction in the short-wavelength infrared range are performed more favorably.

In the above short-wavelength infrared imaging lens, preferably, an object-side surface of the first lens group is concave on the object side and, when a focal length of the first lens group is represented by f1, a focal length of an entire system is represented by f, and a distance between the first lens group and the second lens group is represented by $d_{12}$, following conditional expressions (5) and (6) are satisfied:

$$-1.5 < f1/f < -1.0 \quad (5)$$

$$0.35 < d_{12}/f < 0.6 \quad (6)$$

According to this configuration, a sufficient back focus is obtained and the spherical aberration is corrected favorably.

An imaging device according to one embodiment of the present invention includes the aforementioned short-wavelength infrared imaging lens.

According to the short-wavelength infrared imaging lens according to the present invention, both sufficient chromatic aberration correction and sufficient spherical aberration correction can be achieved in the short-wavelength infrared range without using an aspherical lens, and a sufficient back focus can be obtained.

DESCRIPTION OF THE PREFERRED EMBODIMENT(S)

Hereinafter, embodiments of a short-wavelength infrared imaging lens according to the present invention will be described with reference to the accompanying drawings. In this description, a lens having a positive refractive power is referred to as a positive lens, and a lens having a negative refractive power is referred to as a negative lens.

First Embodiment

Figure 1:
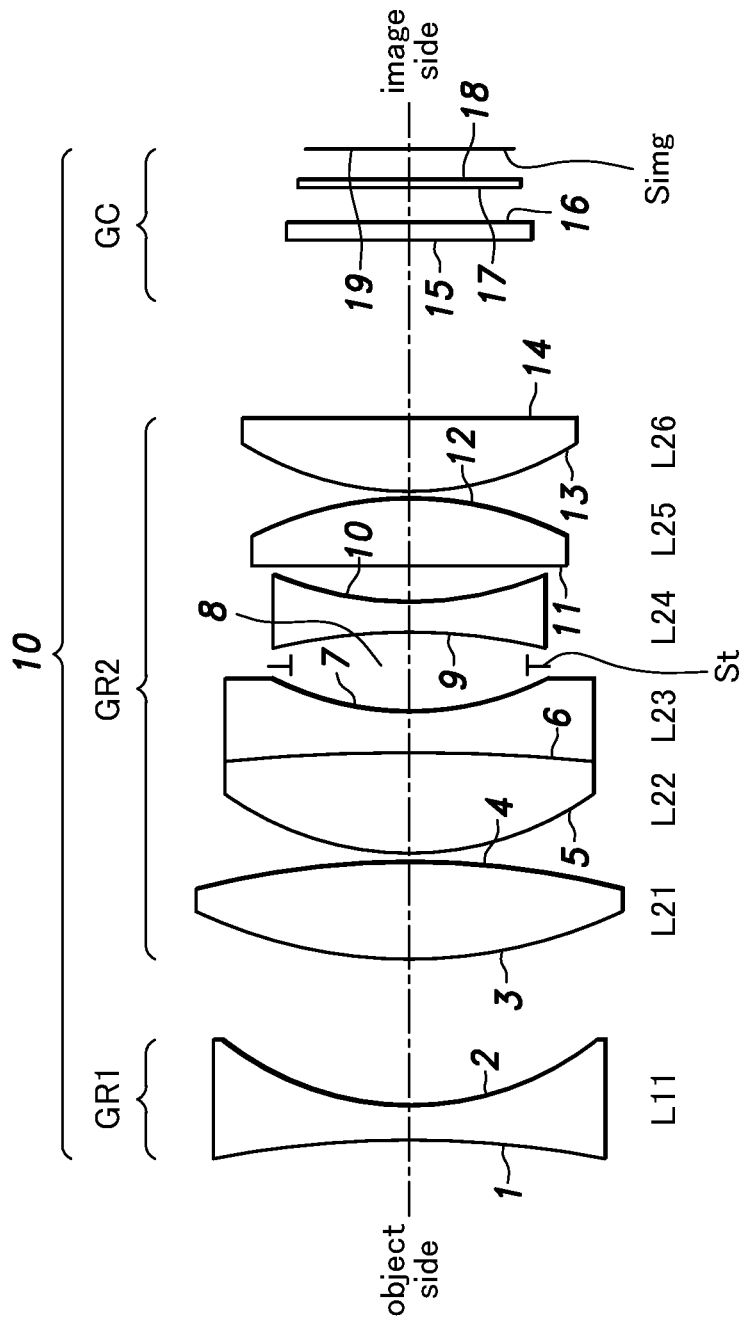
FIG. 1 is a sectional view showing a configuration of a short-wavelength infrared imaging lens according to a first embodiment of the present invention.

FIG. 1 shows a short-wavelength infrared imaging lens (infrared imaging lens) 10 of the first embodiment. In FIG. 1, the left side is the object side, and the right side is the image side. In FIG. 1, reference numerals 1, 2, 3, . . . indicate surface numbers Si of the lenses.

The short-wavelength infrared imaging lens 10 of the first embodiment includes a first lens group GR1 and a second lens group GR2 arranged on the same optical axis in order from the object side.

The first lens group GR1 includes one negative lens L11 and has a negative refractive power. The second lens group GR2 is composed of six spherical lenses including positive lenses L21 and L22, negative lenses L23 and L24, and positive lenses L25 and L26 in order from the object side, and has a positive refractive power as a whole.

Thus, the short-wavelength infrared imaging lens 10 includes, in order from the object side, the first lens group GR1 having a negative refractive power as a whole and the second lens group GR2 having a positive refractive power as a whole. Note that the first lens group GR1 may be composed of a plurality of lenses including the negative lens L11.

In the short-wavelength infrared imaging lens 10, since the first lens group GR1 including the negative lens L11 having a negative refractive power is arranged on the object side and the second lens group GR2 including the positive lenses L21, L22, L25, and L26 having a positive refractive power is arranged on the image side, a sufficient back focus can be achieved.

An aperture stop St is arranged between the negative lenses L23 and L24 of the second lens group GR2. As a result, the second lens group GR2 is divided into a second lens front group composed of three lenses, i.e, the positive lenses L21, L22 and the negative lens L23 disposed on the object side of the aperture stop St and a second lens rear group composed of three lenses, i.e., the negative lens L24 and the positive lenses L25 and L26 disposed on the image side of the aperture stop St.

An image sensor (not shown in the drawings) is arranged on an image plane Simg of the short-wavelength infrared imaging lens 10. Various optical components GC are arranged between the second lens group GR2 and the image sensor according to the configuration of a device on which the short-wavelength infrared imaging lens 10 is mounted. As the optical components GC, for example, a filter, a cover glass, and the like may be arranged.

As shown in Table 2 below, the positive lenses L22, L25, and L26 of the second lens group GR2 satisfy both the following conditional expressions (1) and (2) with respect to an Abbe number V2p and a refractive index N2p thereof. Here, the Abbe number V2p is the Abbe number of the one or more positive lenses of the second lens group GR2 in the short-wavelength infrared range, and N2p is a refractive index N [1.53] of the one or more positive lens at a wavelength of 1.53 μm.

$$V2p > 40 \quad (1)$$

$$N2p > 1.7 \quad (2)$$

Note that when the refractive index at a wavelength of 0.9 μm is represented by N [0.9], the refractive index at a wavelength of 1.53 µm is represented by N [1.53], and the refractive index at a wavelength of 2.325 µm is represented by N [2.325], the Abbe number V2p in the short-wavelength infrared range is defined as V2p=(N [1.53]−1)/(N [0.9]−N [2.325]).

If the Abbe number V2p is lower than the lower limit of the conditional expression (1), chromatic aberration cannot be corrected sufficiently and the imaging performance deteriorates. If the refractive index N2p is lower than the lower limit of the conditional expression (2), spherical aberration cannot be corrected sufficiently and the imaging performance deteriorates.

In the short-wavelength infrared imaging lens 10 of the present embodiment, since at least one positive lens (the positive lenses L22, L25, and L26 in this embodiment) of the second lens group GR2 satisfies both the conditional expressions (1) and (2), both sufficient chromatic aberration correction and sufficient spherical aberration correction are achieved in the short-wavelength infrared range without using an aspheric lens.

Further, the negative lenses L23 and L24 of the second lens group GR2 satisfy both the following conditional expressions (3) and (4) with respect to an Abbe number V2n and a refractive index N2n thereof. Here, N2n is a refractive index N [1.53] of the at least one negative lens at a wavelength of 1.53 µm, and V2n is the Abbe number defined in the short-wavelength infrared range.

$$V2N<22 \tag{3}$$

$$N2n>1.81 \tag{4}$$

Note that when the refractive index at a wavelength of 0.9 µm is represented by N [0.9], the refractive index at a wavelength of 1.53 µm is represented by N [1.53], and the refractive index at a wavelength of 2.325 µm is represented by N [2.325], the Abbe number V2n in the short-wavelength infrared range is defined as V2n=(N [1.53]−1)/(N [0.9]−N [2.325]).

If the Abbe number V2n is higher than the upper limit of the conditional expression (3), chromatic aberration cannot be corrected sufficiently and the imaging performance deteriorates. If the refractive index N2n is lower than the lower limit of the conditional expression (4), sufficient divergence of the light flux cannot be achieved, and the correction of spherical aberration becomes insufficient, resulting in a decrease in the imaging performance.

In the short-wavelength infrared imaging lens 10 of the present embodiment, since at least one negative lens (the negative lenses L23 and L24 in this embodiment) of the second lens group GR2 satisfies both the conditional expressions (3) and (4), the correction of chromatic aberration and spherical aberration in the short-wavelength infrared range is performed even better without using an aspherical lens.

In addition, the illustrated configuration is made such that both the above-described second lens front group and the second lens rear group satisfy all of the conditional expressions (1) to (4) (Namely, the positive lens L22 of the second lens front group satisfies the conditional expressions (1) and (2), the negative lens L23 of the second lens front group satisfies the conditional expressions (3) and (4), each of the positive lenses L25 and L26 of the second lens rear group satisfies the conditional expressions (1) and (2), and the negative lens L24 of the second lens front group satisfies the conditional expressions (3) and (4)). This allows the correction of chromatic aberration and spherical aberration in the short-wavelength infrared range to be performed more favorably.

Further, when the focal length of the first lens group GR1 is represented by f1, the focal length of the entire system is represented by f, and the distance between the first lens group GR1 and the second lens group GR2 is represented by $d_{12}$, it is advantageous in ensuring a sufficient back focus and correcting spherical aberration that the object-side surface of the first lens group GR1 (the surface having the surface number 1 in the illustrated embodiment) is concave on the object side and the following conditional expressions (5) and (6) are satisfied:

$$-1.5<f1/f<-1.0 \tag{5}$$

$$0.35<di2/f<0.6 \tag{6}$$

In the first embodiment, f1/f=−1.32, $d_{12}$=D2, and D2/f=0.41.

If f1/f is below the lower limit of the conditional expression (5), the power of the first lens group GR1 becomes weak and spherical aberration becomes under-corrected. Conversely, if f1/f exceeds the upper limit, the power of the first lens group GR1 becomes too strong and spherical aberration is overcorrected.

If $d_{12}$ is smaller than the lower limit of the conditional expression (6), the distance between the first lens group GR1 and the second lens group GR2 becomes short and it becomes impossible to obtain a sufficient back focus. Conversely, If $d_{12}$ exceeds the upper limit, the distance between the first lens group GR1 and the second lens group GR2 becomes large, whereby the overall length of the optical system (namely, the short-wavelength infrared imaging lens 10) increases and spherical aberration cannot be corrected sufficiently, resulting in a decrease in the imaging performance.

Figure 2:
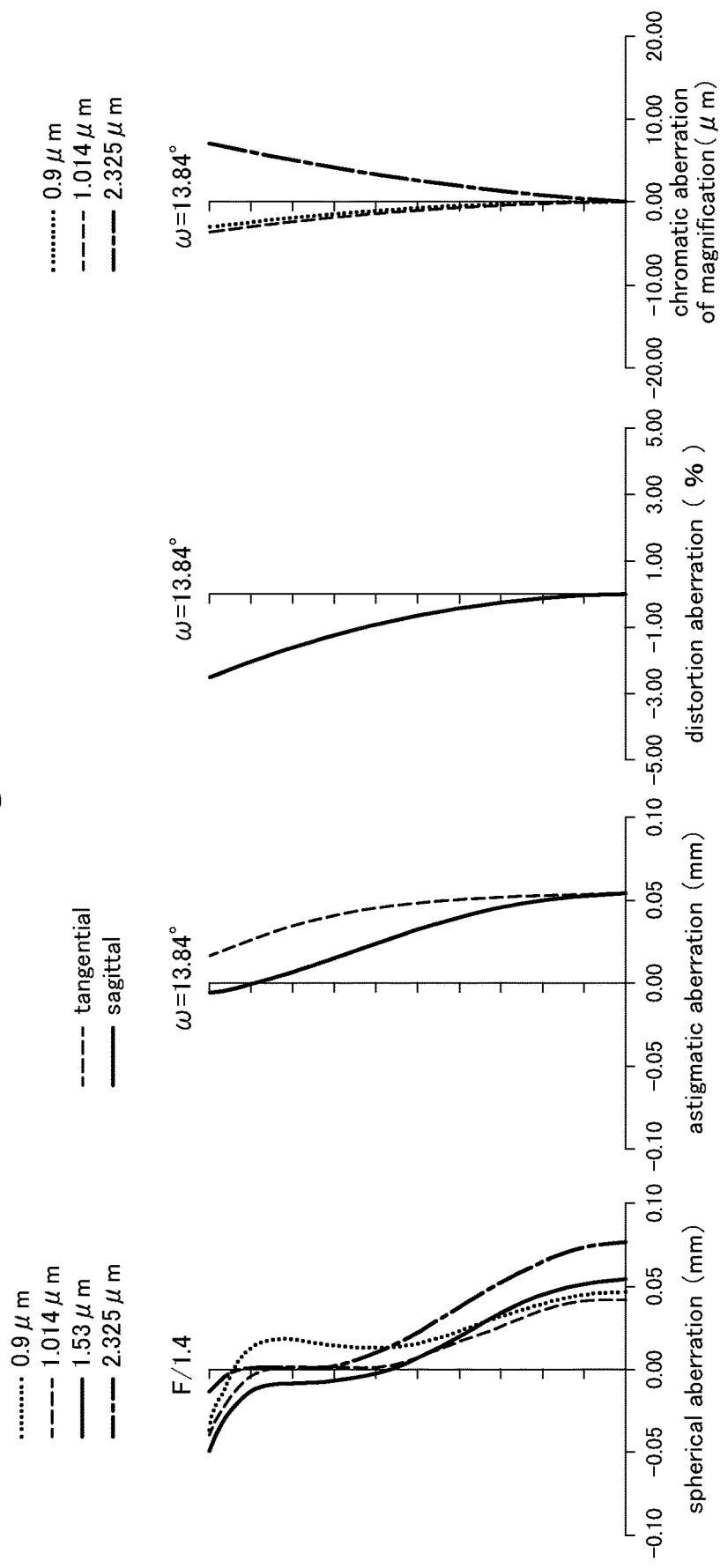
FIG. 2 is an aberration diagram of the short-wavelength infrared imaging lens according to the first embodiment.

FIG. 2 shows various aberrations (spherical aberration, astigmatic aberration, distortion aberration, and chromatic aberration of magnification) of the short-wavelength infrared imaging lens 10 of the first embodiment.

Table 1 shows the overall specifications of the first embodiment, and Table 2 shows the lens data of the same.

TABLE 1

| | |
|---|---|
| focal length | 25.04 mm |
| f-number | 1.4 |
| back focus | 17.9 mm |
| entire angle of view | 27.68° |

TABLE 2

| Si (surface number) | Ri (radius of curvature) | Di (surface spacing) | Ni[0.9] (refractive index) | Ni[1.014] (refractive index) | Ni[1.53] (refractive index) | Ni[2.325] (refractive index) | Vi (Abbe number defined in short-wavelength infrared range) |
|---|---|---|---|---|---|---|---|
| 1 | −76.911 | 2.30 | 1.49126 | 1.49010 | 1.48610 | 1.47952 | 41.4 |
| 2 | 20.531 | 10.25 | | | | | |

TABLE 2-continued

| Si (surface number) | Ri (radius of curvature) | Di (surface spacing) | Ni[0.9] (refractive index) | Ni[1.014] (refractive index) | Ni[1.53] (refractive index) | Ni[2.325] (refractive index) | Vi (Abbe number defined in short-wavelength infrared range) |
|---|---|---|---|---|---|---|---|
| 3 | 35.884 | 6.50 | 1.86397 | 1.86054 | 1.85023 | 1.83590 | 30.3 |
| 4 | −60.357 | 0.50 | | | | | |
| 5 | 20.897 | 7.00 | 1.73608 | 1.73354 | 1.72670 | 1.71895 | 42.4 |
| 6 | −194.71 | 3.00 | 1.88430 | 1.87807 | 1.86145 | 1.84215 | 20.4 |
| 7 | 23.39 | 3.16 | | | | | |
| 8 | ∞ (aperature stop) | 2.26 | | | | | |
| 9 | −34.145 | 2.00 | 1.88430 | 1.87807 | 1.86145 | 1.84215 | 20.4 |
| 10 | 23.383 | 2.14 | | | | | |
| 11 | 111.228 | 5.00 | 1.73608 | 1.73354 | 1.72670 | 1.71895 | 42.4 |
| 12 | −23.225 | 0.50 | | | | | |
| 13 | 22.008 | 5.00 | 1.73608 | 1.73354 | 1.72670 | 1.71895 | 42.4 |
| 14 | 470.761 | 12.39 | | | | | |
| 15 | ∞ | 1.00 | 1.45175 | 1.45024 | 1.44426 | 1.43293 | 23.6 |
| 16 | ∞ | 2.50 | | | | | |
| 17 | ∞ | 0.50 | 1.45175 | 1.45024 | 1.44426 | 1.43293 | 23.6 |
| 18 | ∞ | 1.97 | | | | | |
| 19 | ∞ | | | | | | |

Second Embodiment

FIG. 2 shows a short-wavelength infrared imaging lens 20 according to the second embodiment. In FIG. 2 also, the left side is the object side, and the right side is the image side. Note that in FIG. 2, portions corresponding to those in FIG. 1 are denoted by the same reference numerals as those in FIG. 1, and description thereof will be omitted.

In the short-wavelength infrared imaging lens 20, a positive lens L27 is added between the positive lens L21 closest to the object and the positive lens L22 next closest to the object in the front group of the second lens group GR2.

The addition of the positive lens L27 particularly improves spherical aberration, astigmatic aberration, and lateral chromatic aberration even further.

Figure 4:
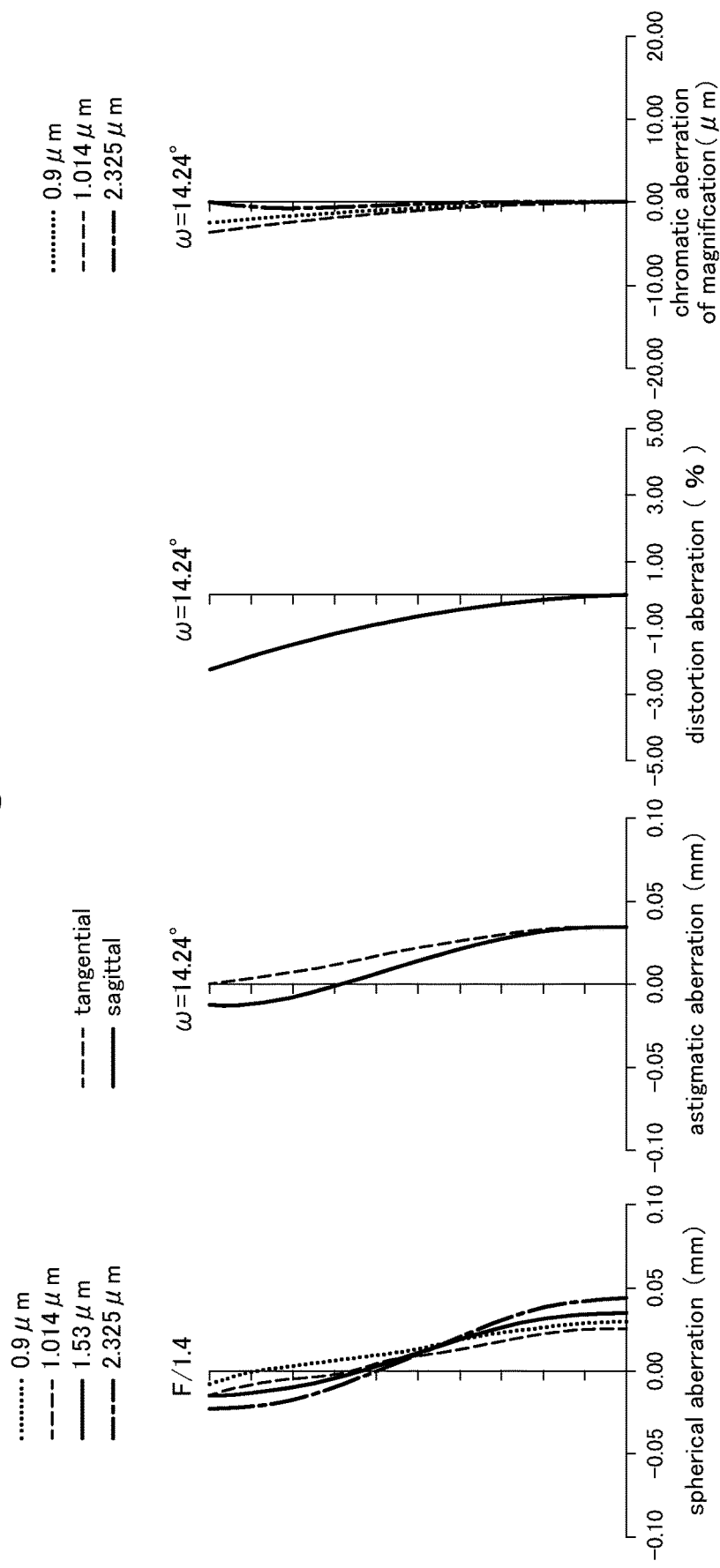
FIG. 4 is an aberration diagram of the short-wavelength infrared imaging lens according to the second embodiment.

FIG. 4 shows various aberrations (spherical aberration, astigmatic aberration, distortion aberration, and chromatic aberration of magnification) of the short-wavelength infrared imaging lens 20 of the second embodiment.

Table 3 shows the overall specifications of the second embodiment, and Table 4 shows the lens data of the same.

TABLE 3

| focal length | 25.00 mm |
| f-number | 1.4 |
| back focus | 17.79 mm |
| entire angle of view | 28.48° |

TABLE 4

| Si (surface number) | Ri (radius of curvature) | Di (surface spacing) | Ni[0.9] (refractive index) | Ni[1.014] (refractive index) | Ni[1.53] (refractive index) | Ni[2.325] (refractive index) | Vi (Abbe number defined in short-wavelength infrared range) |
|---|---|---|---|---|---|---|---|
| 1 | −186.573 | 2.00 | 1.73608 | 1.73354 | 1.72670 | 1.71895 | 42.4 |
| 2 | 26.486 | 13.13 | | | | | |
| 3 | 75.241 | 4.74 | 1.73608 | 1.73354 | 1.72670 | 1.71895 | 42.4 |
| 4 | −101.659 | 0.50 | | | | | |
| 5 | 37.021 | 5.36 | 1.82807 | 1.82429 | 1.81379 | 1.80096 | 30.0 |
| 6 | −186.219 | 0.50 | | | | | |
| 7 | 19.266 | 6.08 | 1.73608 | 1.73354 | 1.72670 | 1.71895 | 42.4 |
| 8 | 154.793 | 3.00 | 1.88430 | 1.87807 | 1.86145 | 1.84215 | 20.4 |
| 9 | 14.729 | 4.28 | | | | | |
| 10 | ∞ (aperature stop) | 2.11 | | | | | |
| 11 | −34.878 | 2.00 | 1.88430 | 1.87807 | 1.86145 | 1.84215 | 20.4 |
| 12 | 24.711 | 1.96 | | | | | |
| 13 | 75.789 | 4.29 | 1.73608 | 1.73354 | 1.72670 | 1.71895 | 42.4 |
| 14 | −25.811 | 0.43 | | | | | |
| 15 | 23.458 | 4.37 | 1.73608 | 1.73354 | 1.72670 | 1.71895 | 42.4 |
| 16 | −391.973 | 12.27 | | | | | |
| 17 | ∞ | 1.00 | 1.45175 | 1.45024 | 1.44426 | 1.43293 | 23.6 |
| 18 | ∞ | 2.50 | | | | | |
| 19 | ∞ | 0.50 | 1.45175 | 1.45024 | 1.44426 | 1.43293 | 23.6 |
| 20 | ∞ | 1.98 | | | | | |
| 21 | ∞ | | | | | | |

Third Embodiment

Figure 3:
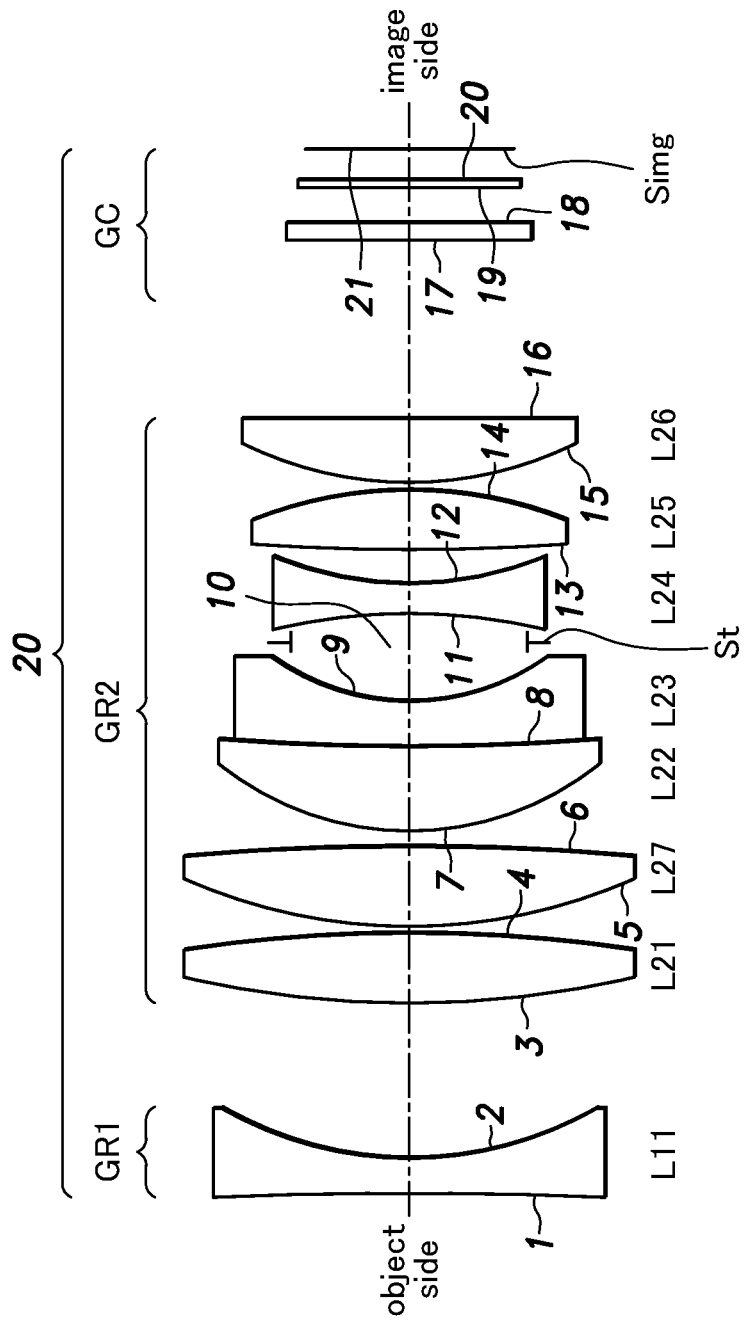
FIG. 3 is a sectional view showing a configuration of a short-wavelength infrared imaging lens according to a second embodiment of the present invention.
Figure 5:
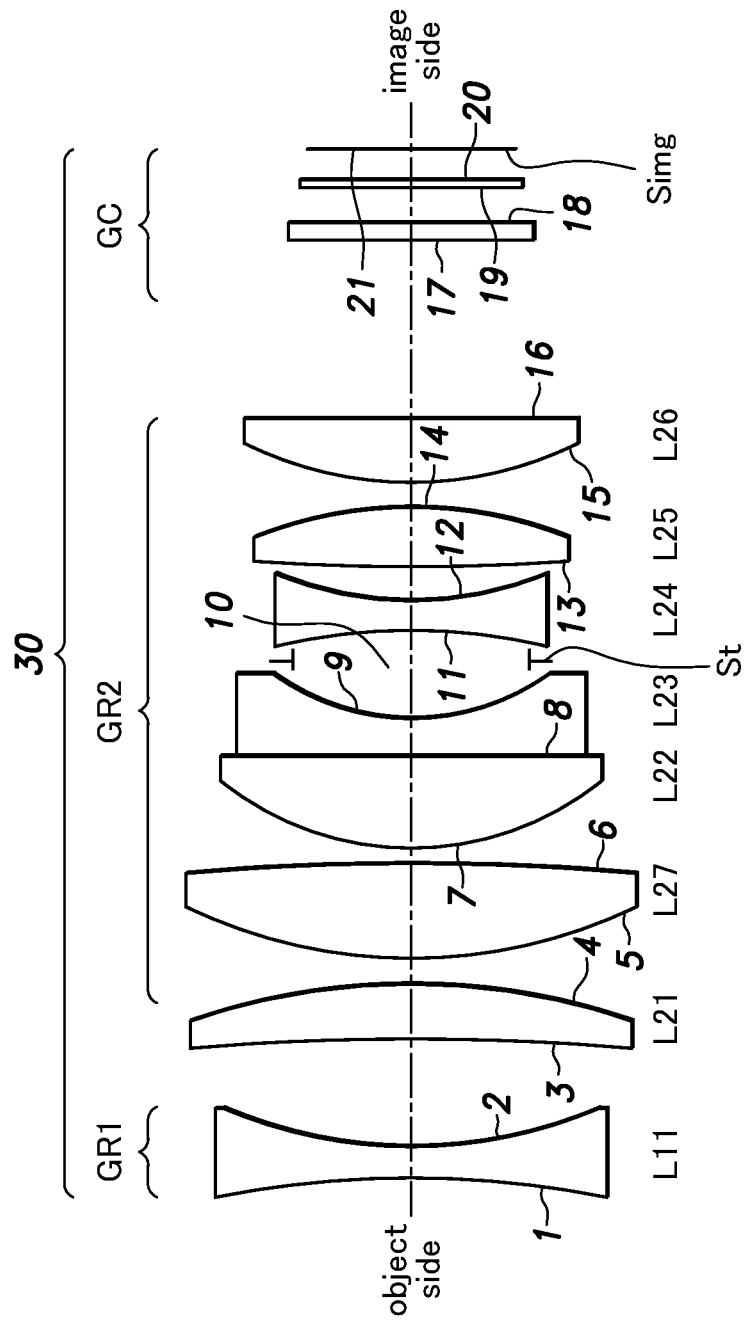
FIG. 5 is a sectional view showing a configuration of a short-wavelength infrared imaging lens according to a third embodiment of the present invention.

FIG. 5 shows a short-wavelength infrared imaging lens 30 according to the third embodiment. In FIG. 5 also, the left side is the object side, and the right side is the image side. Note that in FIG. 5, the portions corresponding to those in FIGS. 1 and 3 are denoted by the same reference numerals as those in FIGS. 1 and 3, and the description thereof will be omitted.

In the third embodiment, the object-side surface 3 of the most object-side positive lens L21 of the front group of the second lens group GR2 is concave. This particularly improves astigmatic aberration even further.

Figure 6:
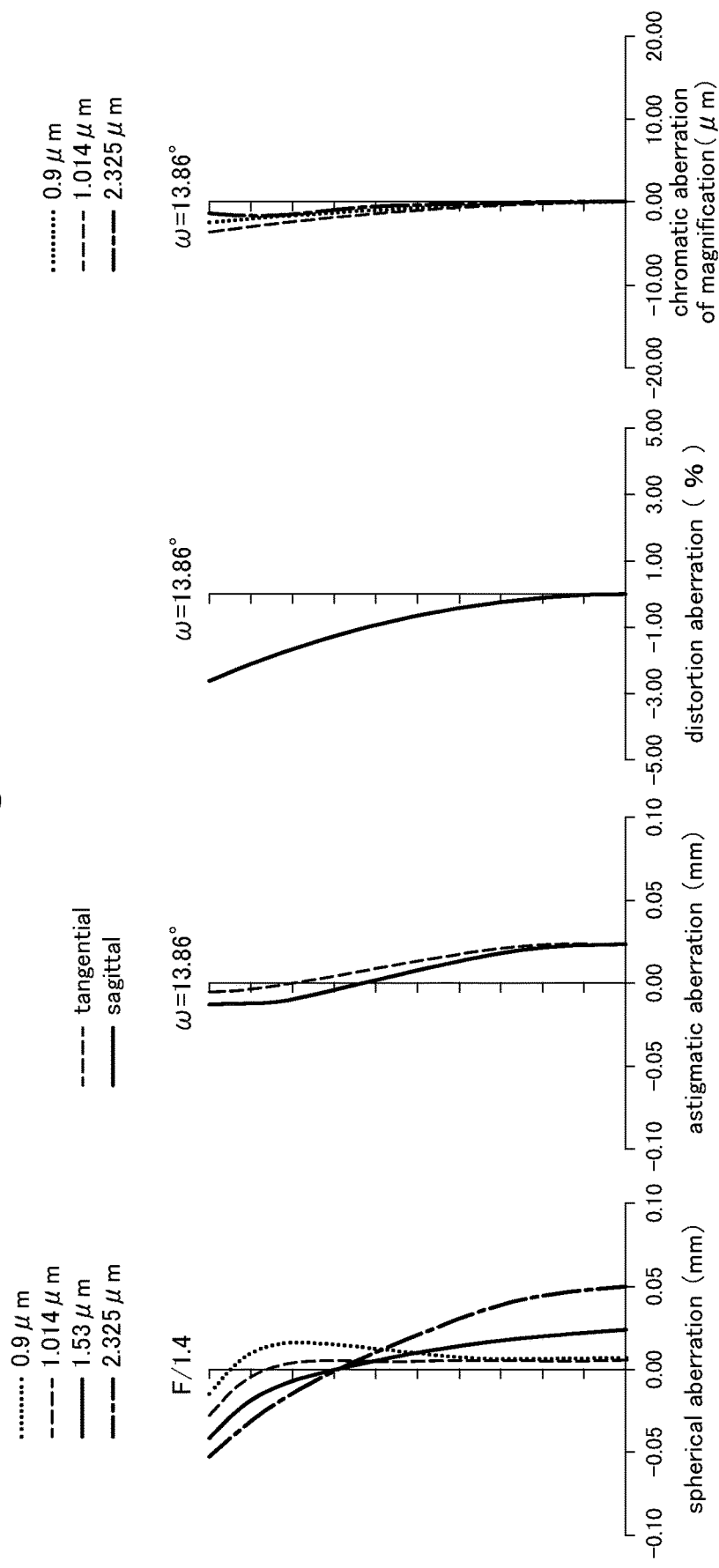
FIG. 6 is an aberration diagram of a short-wavelength infrared imaging lens according to the third embodiment.

FIG. 6 shows various aberrations (spherical aberration, astigmatic aberration, distortion aberration, and chromatic aberration of magnification) of the short-wavelength infrared imaging lens 30 of the third embodiment.

Table 5 shows the overall specifications of the third embodiment, and Table 6 shows the lens data of the same.

TABLE 5

| | |
|---|---|
| focal length | 25.00 mm |
| f-number | 1.4 |
| back focus | 18.04 mm |
| entire angle of view | 27.71° |

TABLE 6

| Si (surface number) | Ri (radius of curvature) | Di (surface spacing) | Ni[0.9] (refractive index) | Ni[1.014] (refractive index) | Ni[1.53] (refractive index) | Ni[2.325] (refractive index) | Vi (Abbe number defined in short-wavelength infrared range) |
|---|---|---|---|---|---|---|---|
| 1 | −56.847 | 2.00 | 1.73608 | 1.73354 | 1.72670 | 1.71895 | 42.4 |
| 2 | 33.615 | 9.84 | | | | | |
| 3 | −179.533 | 4.00 | 1.73608 | 1.73354 | 1.72670 | 1.71895 | 42.4 |
| 4 | −41.925 | 1.66 | | | | | |
| 5 | 32.476 | 7.00 | 1.82807 | 1.82429 | 1.81379 | 1.80096 | 30.0 |
| 6 | −137.793 | 0.50 | | | | | |
| 7 | 19.667 | 6.26 | 1.73608 | 1.73354 | 1.72670 | 1.71895 | 42.4 |
| 8 | 375.032 | 3.00 | 1.88430 | 1.87807 | 1.86145 | 1.84215 | 20.4 |
| 9 | 16.055 | 3.33 | | | | | |
| 10 | ∞ (aperature stop) | 2.04 | | | | | |
| 11 | −29.993 | 2.00 | 1.88430 | 1.87807 | 1.86145 | 1.84215 | 20.4 |
| 12 | 25.595 | 1.85 | | | | | |
| 13 | 75.691 | 5.00 | 1.73608 | 1.73354 | 1.72670 | 1.71895 | 42.4 |
| 14 | −25.1 | 1.00 | | | | | |
| 15 | 24.862 | 5.00 | 1.73608 | 1.73354 | 1.72670 | 1.71895 | 42.4 |
| 16 | −262.584 | 12.50 | | | | | |
| 17 | ∞ | 1.00 | 1.45175 | 1.45024 | 1.44426 | 1.43293 | 23.6 |
| 18 | ∞ | 2.50 | | | | | |
| 19 | ∞ | 0.50 | 1.45175 | 1.45024 | 1.44426 | 1.43293 | 23.6 |
| 20 | ∞ | 2.00 | | | | | |
| 21 | ∞ | | | | | | |

Table 7 shows the values relating to the conditional expressions for each of the first to third embodiments.

TABLE 7

| symbol | conditional expression | embodiment 1 | embodiment 2 | embodiment 3 |
|---|---|---|---|---|
| V2p | (1) V2p > 40 | 42.4 | 42.4 | 42.4 |
| N2p | (2) N2p > 1.7 | 1.72670 | 1.72670 | 1.72670 |
| V2n | (3) V2n < 22 | 20.4 | 20.4 | 20.4 |
| N2n | (4) N2u > 1.81 | 1.86145 | 1.86145 | 1.86145 |
| f | | 25.04 | 25.00 | 25.00 |
| fl | | −33.08 | −31.79 | −28.80 |
| dl2 | | 10.25 | 13.13 | 9.84 |
| fl/f | (5) −1.5 < fl/f < −1.0 | −1.32 | −1.27 | −1.15 |
| dl2/f | (6) 0.35 < dl2/f < 0.6 | 0.41 | 0.53 | 0.39 |

Figure 7:
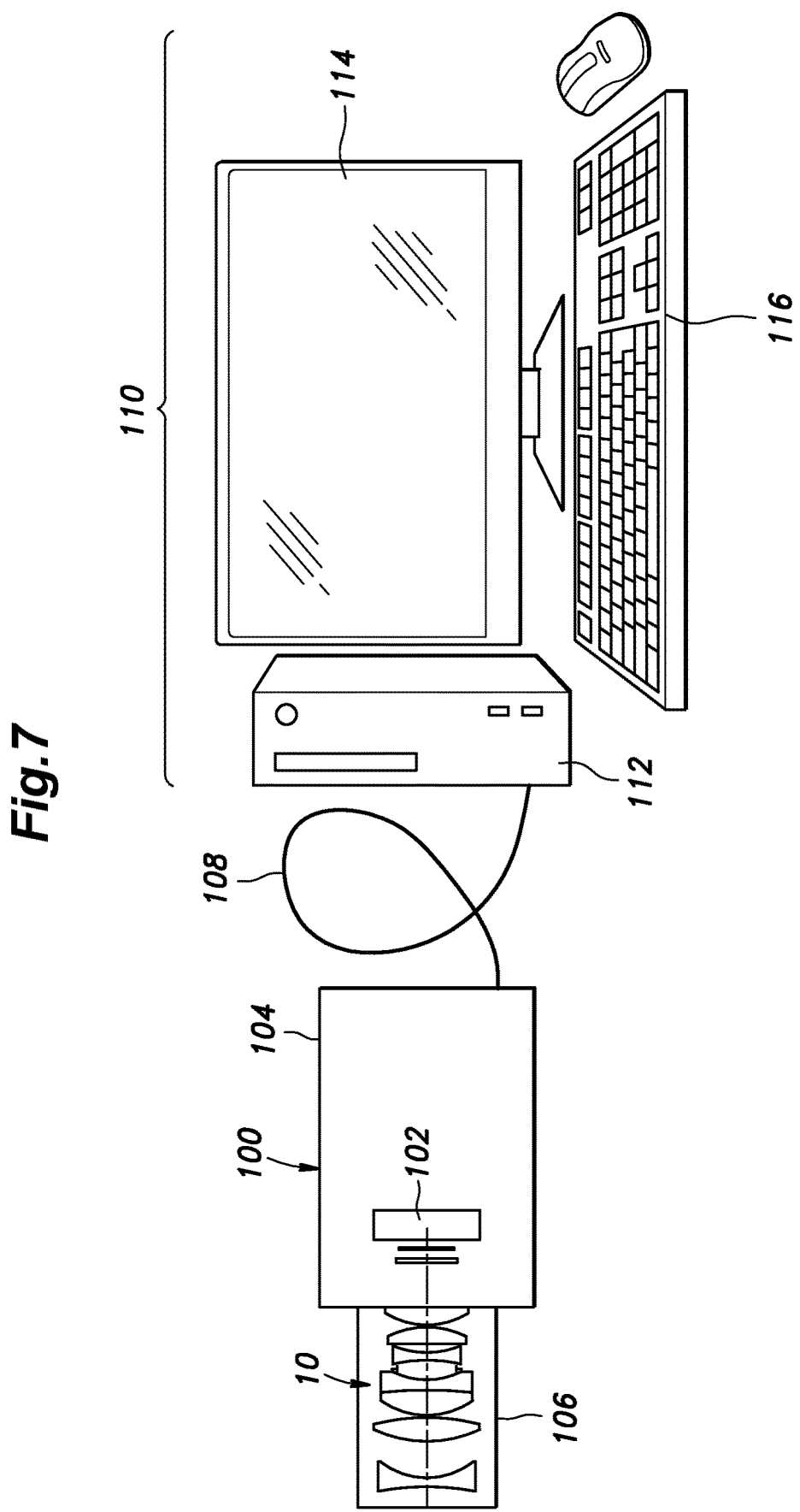
FIG. 7 is a configuration diagram showing an embodiment of an imaging system including an imaging device according to the present invention.

Next, an imaging system including an imaging device according to an embodiment of the present invention will be described with reference to FIG. 7.

The imaging system includes an infrared camera (imaging device) 100. The infrared camera 100 includes a camera body 104 having a built-in image sensor 102 and the like, and a lens barrel 106 attached to a front portion of the camera body 104. The lens barrel 106 accommodates the lenses of the short-wavelength infrared imaging lens 10. The image sensor 102 is for infrared light, and specifically consists of a device configured to capture an optical image formed by the short-wavelength infrared imaging lens 10 using short-wavelength infrared rays in a band of 1000 to 2500 nm and to convert the optical image into an electric signal (image signal).

The infrared camera 100 is electrically connected to a processing and display device 110 by a cord 108. Note that the infrared camera 100 may be connected to the processing and display device 110 by wireless communication or the like. The processing and display device 110 includes a processing unit 112 such as a computer, a display unit 114 such as a liquid crystal display, and an input unit 116 such as a key board and a mouse.

The optical image obtained by the short-wavelength infrared imaging lens 10 is converted into an image signal by the image sensor 102 and transmitted to the processing and display device 110. The image signal transmitted from the image sensor 102 is processed by the processing unit 112 based on instructions input by the user using the input unit 116, and an image obtained by the processing is displayed on the display unit 114. For example, an image of a subject captured by the infrared camera 100, the brightness distribution of the subject, and the like are displayed in color on the display unit 114 after being processed by the processing unit 112.

Optical components such as a cover glass for protecting the image sensor 102, various filters, etc. may be arranged between the most image-side lens of the short-wavelength infrared imaging lens 10 and the image sensor 102 depending on the configuration of the camera on which the lens is mounted. Further, a shutter mechanism for image capturing may be provided.

In the foregoing, the present invention has been described in terms of preferred embodiments thereof. However, the present invention is not limited to the above embodiments, and various modifications are possible. For example, the values of the radius of curvature, the surface spacing (center thickness), the refractive index, the aspheric coefficient, the diffractive surface coefficient, and the like of each lens are not limited to the values described in the above embodiments but may take other values.

Further, all of the components shown in the above embodiment(s) are not necessarily indispensable and they may be selectively adopted as appropriate without departing from the scope of the present invention.

The invention claimed is:

1. A short-wavelength infrared imaging lens comprising a first lens group and a second lens group arranged in order from an object side, the first lens group having a negative refractive power as a whole and the second lens group having a positive refractive power as a whole, wherein the second lens group includes at least one positive lens that satisfies both following conditional expressions (1) and (2) with respect to an Abbe number V2p and a refractive index N2p thereof:

$V2p > 40$ (1)

$N2p > 1.7$ (2)

where N2p is a refractive index N [1.53] of the at least one positive lens at a wavelength of 1.53 μm, and the Abbe number V2p is an Abbe number of the at least one positive lens in a short-wavelength infrared range and is defined as (N [1.53]−1)/(N [0.9]−N [2.325]) when refractive indexes of the at least one positive lens at wavelengths of 0.9 μm, 1.53 μm, and 2.325 μm are represented by N [0.9], N [1.53], and N [2.325], respectively; and wherein an object-side surface of the first lens group is concave on the object side and, when a focal length of the first lens group is represented by f1, a focal length of an entire system is represented by f, and a distance between the first lens group and the second lens group is represented by $d_{12}$, following conditional expressions (5) and (6) are satisfied:

$-1.5 < f1/f < -1.0$ (5)

$0.35 < d_{12}/f < 0.6$ (6).

2. The short-wavelength infrared imaging lens according to claim 1, wherein the second lens group further includes at least one negative lens that satisfies both following conditional expressions (3) and (4) with respect to an Abbe number V2n and a refractive index N2n thereof:

$V2N < 22$ (3)

$N2n > 1.81$ (4)

where N2n is a refractive index N [1.53] of the at least one negative lens at a wavelength of 1.53 μm, and the Abbe number V2n is an Abbe number of the at least one negative lens in the short-wavelength infrared range and is defined as (N [1.53]−1)/(N [0.9]−N [2.325]) when refractive indexes of the at least one negative lens at wavelengths of 0.9 μm, 1.53 μm, and 2.325 μm are represented by N [0.9], N [1.53], and N [2.325], respectively.

3. The short-wavelength infrared imaging lens according to claim 2, wherein the second lens group includes an aperture stop, a second lens front group composed of at least three lenses disposed on an object side of the aperture stop, and a second lens rear group composed of at least three lenses disposed on an image side of the aperture stop, and wherein the at least one positive lens comprises a positive lens included in the second lens front group and a positive lens included in the second lens rear group, and the at least one negative lens comprises a negative lens included in the second lens front group and a negative lens included in the second lens rear group.

4. An imaging device comprising the short-wavelength infrared imaging lens according to claim 1.

* * * * *